US010715856B2

United States Patent
Ghosh et al.

(10) Patent No.: US 10,715,856 B2
(45) Date of Patent: Jul. 14, 2020

(54) DEVICES, METHODS, AND PROGRAM PRODUCTS ENABLING CONCURRENT PERSONAL NETWORK STREAMING AND WIDE AREA NETWORK ACCESS

(71) Applicant: SLING MEDIA PVT LTD, Bangaluru (IN)

(72) Inventors: Nirupam Ghosh, Durgapur (IN); Trinadha Harish Babu Pallapothu, Chirala (IN)

(73) Assignee: SLING MEDIA PVT LTD, Bangaluru (IN)

( * ) Notice: Subject to any disclaimer, the term of this patent is extended or adjusted under 35 U.S.C. 154(b) by 132 days.

(21) Appl. No.: 16/128,721

(22) Filed: Sep. 12, 2018

(65) Prior Publication Data

US 2020/0084495 A1    Mar. 12, 2020

(51) Int. Cl.
| | |
|---|---|
| *H04L 12/00* | (2006.01) |
| *H04N 21/414* | (2011.01) |
| *H04N 21/854* | (2011.01) |
| *H04N 21/4627* | (2011.01) |
| *H04L 29/06* | (2006.01) |
| *G06F 21/10* | (2013.01) |

(52) U.S. Cl.
CPC ....... *H04N 21/41407* (2013.01); *G06F 21/10* (2013.01); *H04L 65/1069* (2013.01); *H04L 65/4069* (2013.01); *H04L 65/608* (2013.01); *H04N 21/4627* (2013.01); *H04N 21/854* (2013.01)

(58) Field of Classification Search
CPC ............... H04L 65/608; H04L 65/1069; H04L 65/4069; H04N 21/4627; H04N 21/854; H04N 21/41407; G06F 21/10
USPC ......................................... 709/201, 213, 231
See application file for complete search history.

(56) References Cited

U.S. PATENT DOCUMENTS

| | | | |
|---|---|---|---|
| 7,203,758 B2 * | 4/2007 | Cook ..................... | H04N 7/165 348/E7.063 |
| 7,395,339 B2 * | 7/2008 | Kirkland ........... | H04L 29/06027 709/203 |
| 8,285,228 B2 * | 10/2012 | Chang ................. | H04L 25/0278 455/123 |
| 8,934,465 B1 * | 1/2015 | Evans ................... | H04W 76/14 370/338 |

(Continued)

*Primary Examiner* — Frantz Coby
(74) *Attorney, Agent, or Firm* — Lorenz & Kopf LLP (57) ABSTRACT

Devices (e.g., client media receivers), methods, and program products are provided enabling personal network streaming and concurrent Wide Area Network (WAN) access. In embodiments, the method is carried-out by a client media receiver utilized with a Personal Video Recorder (PVR) and a display device. The method includes the step or process of identifying a user desire to conduct a wireless PVR viewing session utilizing the receiver, while maintaining wireless access to a WAN. When identifying such a user desire, the receiver: (i) creates a personal Local Area Network (LAN) enabling wireless communication between the receiver and the PVR, and (ii) establishes Dual Virtual Antenna (DVA) parameters defining first and second virtual antennae assigned to the WAN and to the personal LAN, respectively. The second virtual antenna is then utilized to support a wireless PVR viewing session, while WAN data is concurrently routed through the first virtual antenna as needed.

20 Claims, 2 Drawing Sheets

(56) References Cited

U.S. PATENT DOCUMENTS

| | | | | |
|---|---|---|---|---|
| 9,106,723 B2* | 8/2015 | Krikorian | ........ | H04N 21/25891 |
| 9,398,002 B2* | 7/2016 | Dhanabalan | ........ | H04L 63/0823 |
| 10,116,065 B2* | 10/2018 | Pan | ........ | H01C 21/20 |
| 2005/0034159 A1* | 2/2005 | Ophir | ........ | H04L 12/2801 |
| | | | | 725/78 |
| 2007/0199038 A1* | 8/2007 | Choi | ........ | H04N 5/782 |
| | | | | 725/134 |
| 2011/0231660 A1* | 9/2011 | Kanungo | ........ | H04L 63/0435 |
| | | | | 713/168 |
| 2015/0016607 A1* | 1/2015 | Beals | ........ | H04N 21/4181 |
| | | | | 380/211 |
| 2015/0222609 A1* | 8/2015 | Shah | ........ | H04N 7/1675 |
| | | | | 713/168 |

* cited by examiner

DEVICES, METHODS, AND PROGRAM PRODUCTS ENABLING CONCURRENT PERSONAL NETWORK STREAMING AND WIDE AREA NETWORK ACCESS

TECHNICAL FIELD

The following generally relates to media content, and, more particularly, to devices, methods, and program products enabling personal network streaming (that is, streaming of media content over a secure personal local area network) concurrent with wide area network access.

ABBREVIATIONS

Abbreviations appearing relatively infrequently in this document are defined upon initial usage, while abbreviations appearing more frequently in this document are defined below.
 LAN—local area network;
 IEEE—Institute of Electrical and Electronics Engineers;
 I/O—input/output;
 OS—operating system;
 PVR—personal video recorder;
 TV—television; and
 WAN—wide area network.

BACKGROUND

Personal video recorders or, more simply, "PVRs" provide media streams to client media devices without reliance upon access to the Internet or other WANs. When WIFI-enabled, a PVR may provide such media streams over a personal LAN, such as an IEEE 802.11 WIFI wireless LAN, to allow communication over relatively short distances in the absence of a suitable WAN connection. PVRs may be particularly useful in providing media streams when a user is engaged in travel (e.g., via an airplane, car, or other mass carrier) and desires to select amongst large amounts of stored media content for offline viewing without reliance on an active WAN connection. An example of one such WIFI-enabled PVR is the HOPPERGO® device, which is commercially available from DISH NETWORK® of Englewood, Colo. Typically, such PVRs assume the form of network-enabled mass storage devices capable of interfacing with a host device to securely transfer and store media content (e.g., recorded TV programming, full length movies, or other such media content items) for later streaming to a client media device (e.g., a mobile phone, tablet, laptop, wearable device, or other device utilized to playback media content streams) over a personal LAN hosted by the PVR.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Definitions

Client Media Device—a portable electronic device, such as mobile phone, a laptop, a tablet, or a wearable device, suitable for receiving streaming media content from a PVR (defined below) over a personal LAN.

Local PVR streaming session—an event during which media content is streamed from a WIFI-enabled PVR (defined below) over a personal LAN to a media client media receiver (defined above).

Personal Video Recorder (PVR)—a consumer electronic device for storage and streaming delivery of media content items including TV programming, movies, and other multimedia content.

WIFI-enabled PVR—a PVR (defined above) capable of providing media streams to a client media device (also defined above) over a WIFI wireless LAN in accordance with established specifications, such as IEEE 802.11 specifications.

Overview

As indicated above, a WIFI-enabled PVR may provide media streams over a personal LAN (e.g., an IEEE 802.11 WIFI wireless LAN) to a client media device for viewing by an end user. This may allow the end user of the client media device to access and view movies, TV programming, and other such media content items stored on the PVR without reliance upon access to a broader WAN, such as the Internet. This may be particularly useful when the user is traveling on a commercial airliner or other vehicle, the user is currently located in a remote area lacking a reliable WAN connection (e.g., as may occur when the user is camping), or the user otherwise cannot utilize (or desires to avoid usage of) a particular WAN connection. The following document is incorporated by reference and sets-forth examples of networked (e.g., WIFI-enabled) PVRs capable of performing the functions described above: U.S. Pat. No. 9,307,289 B2, entitled "NETWORKED PERSONAL VIDEO STORAGE AND DELIVERY," and issued by the United States Patent and Trademark Office (USPTO) on Apr. 5, 2016.

Traditionally, a client media device may be prevented from concurrently accessing a PVR over a personal LAN, while maintaining an active WAN connection utilizing, for example, a wireless network interface including a single physical antenna. If initially connected to the Internet or another WAN over a WIFI connection through the wireless network interface, the client media device may require termination of the WIFI WAN connection in favor of establishing a new WIFI connection with the WIFI-enabled PVR over a personal LAN hosted by the PVR. Advantageously, this may alleviate any concerns regarding circumvention of copy protection measures, such as copyright protection, Digital Rights Management (DRM), or Persistent Rights Management (PRM). However, as a corollary, interruption of the WIFI WAN connection may inconvenience or frustrate end users, as may the inability to utilize the WIFI WAN connection when viewing media content streamed from a PVR over a personal LAN. In certain instances, the client media receiver may be capable of accessing a wider WAN, such the Internet, utilizing a cellular connection, particularly when the client media receiver assumes the form of a smartphone. However, this workaround may still result in undesired usage of cellular data, bandwidth restrictions, or other such limitations. As a still further limitation, the process by which an end user may be required to disconnect from a WIFI WAN zone and connect to the PVR WIFI zone may be cumbersome or non-intuitive to the average user.

To overcome the issues set-forth above, the following describes devices, methods, and program products enabling WAN access in conjunction with streaming of media content from a WIFI-enabled PVR over a secure personal LAN and to a media client receiver, even when the media client receiver contains a single-antenna WIFI interface. In various embodiments, this is accomplished by creating a Dual Virtual Antenna (DVA) structure or scheme utilizing, for example a software application executing on the OS of the client media receiver. The DVA structure may define at least two virtual or logical antennae, which utilize the same physical antenna and which are each assigned to a different access point. For example, the first virtual antenna may be assigned to the WAN WIFI access point, while the second virtual antenna is assigned to the personal LAN access point supported by the PVR. The application executing on the media client media receiver may then schedule or route traffic accordingly, while periodically pinging one or both the access points, as appropriate, to ensure that both access points remain active throughout a wireless PVR viewing session.

Other complementary functions may also be performed, while the user engages in a local PVR streaming session over the personal LAN. For example, in certain cases, the client media receiver and, more specifically, the application executing on the media receiver OS may combine imagery retrieved via the WAN WIFI connection and display this imagery in combination with a main image depicting the media content streamed from the PVR to the media content receiver. For example, advertisement imagery or other imagery retrieved from a backend service (e.g., a server communicating with the client media receiver over the WAN WIFI connection) and relating to the media content item viewed by the user during the local PVR streaming session may be combined with (e.g., superimposed over), displayed adjacent, or otherwise displayed concurrently with the main image content on the screen of a display device included in the media content receiver or in signal communication therewith. Additionally or alternatively, the media content receiver may monitor for indicia of copy protection violation or opportunities for copy protection violation during a local PVR streaming session, such as attempts by a user to disseminate the streamed PVR content over the WAN WIFI connection. If such attempts to bypass copy protection measures are detected, the media content receiver may further perform certain countermeasures or reactionary functions, such as generating warning messages, terminating one or both of the personal LAN and WAN connections, and/or transmitting data to a backend service over the WAN connection reporting the attempted copy measure violation. Embodiments of the present disclosure also perform other functionalities in addition or in lieu of those set-forth above.

An exemplary system and method for performing such processes will now be described in conjunction with FIGS. 1-2.

Figure 1:
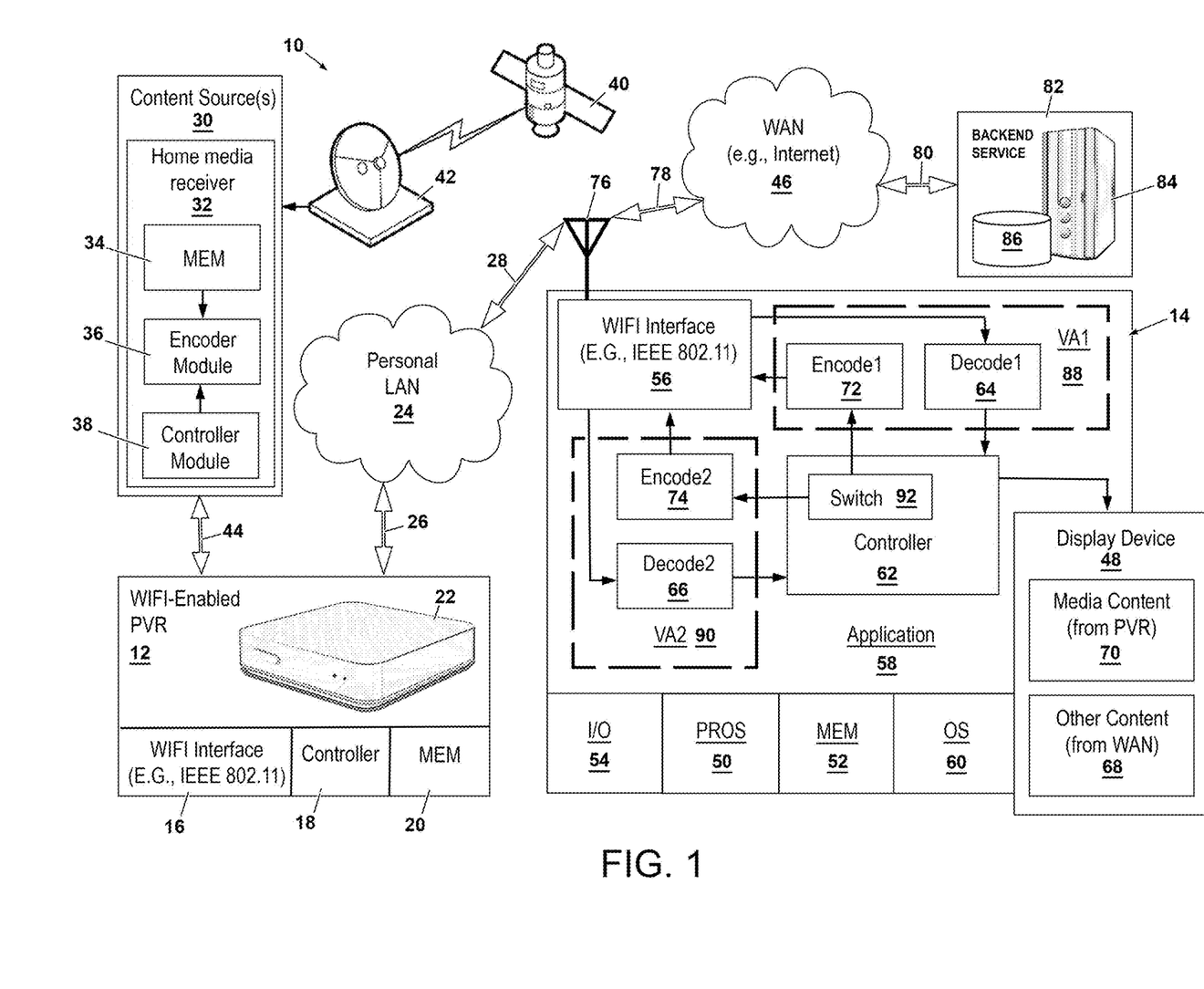
FIG. 1 is a schematic of a media transmission architecture or system including an exemplary WIFI-enabled PVR and an exemplary client media receiver suitable for carrying-out embodiments of the present disclosure.

Exemplary Systems, Devices, and Methods Enabling Local PVR Streaming in Conjunction with Simultaneous WAN Access FIG. 1 is a schematic of a system 10 including a WIFI-enabled PVR 12 and a client media receiver 14, as illustrated in accordance with an exemplary embodiment of the present disclosure. Among other components, WIFI-enabled PVR 12 includes a WIFI interface 16, a controller 18, and a memory 20. Memory 20 contains computer-readable code or instructions, which are executed by controller 18 to perform the functions described herein. Additionally, memory 20 includes a mass storage area 22 (e.g., a hard-drive disk or solid state memory, such as flash memory) for storing media content items, such as movies, TV programming, and other multimedia content. Under certain operation conditions, PVR 12 may utilize WIFI interface 16 to host a personal LAN 24. Client media receiver 14 may join personal LAN 24 to support the wireless streaming transmission of selected media content items from mass storage area 22 to receiver 14 during a local PVR streaming session, as indicated in FIG. 1 by arrows 26, 28. WIFI interface 16 may be implemented in accordance with IEEE 802.11 standards or other industry standards, whether currently known or later established.

The media content stored in mass storage area 22 of PVR 12 may be supplied by any number and type of content sources 30. Often, content sources 30 will include at least one home media receiver 32, such as a Set Top Box (STB) or home Digital Video Recorder (DVR), located within the residence of an end user. In such instances, home media receiver 32 may receive, decode, and generate output signals for such media content, which may then be presented on a display device, such as a home TV set or monitor. Home media receiver 34 may receive TV programming over a satellite or cable distribution system, which may contain satellite 40 in communication with a satellite receiver 42 operably connected to receiver 32. In embodiments, home media receiver 32 may have placeshifting capabilities, which are utilized to transfer media content from receiver 32 to PVR 12 as a livestream. In such embodiments, home media receiver 32 may include a memory 52, an encoder module 36, and a controller module 38, which may function to allow livestream encoding or transcoding (collectively, "encoding") for placeshifting purposes as further discussed below.

When so commanded by a user, home media receiver 32 may transfer selected media content items to mass storage area 22 by placeshifting or live streaming. For example, as indicated in FIG. 1 by arrow 44, home media receiver 32 may transfer media content items to mass storage area 22 by encoding imagery generated by receiver 32 and packetizing the encoded imagery for transmission to PVR 12. Such media content may be streamed from home media receiver 32 to PVR 12 over a wired or wireless connection. The encoded media stream generated by receiver 32 will typically contain both video and audio component streams, which may be combined with packet identification data. Any currently-known or later-developed packetized format can be employed by receiver 32 including, but not limited to, MPEG, QUICKTIME, WINDOWS MEDIA, and/or other formats suitable for transmission to PVR 12. In other embodiments, media files may simply be copied to mass storage area 22 rather than livestreamed thereto, when conditions permit. In still further embodiments, PVR 12 may store media content received in other manners; e.g., media content transmitted over a WAN (e.g., WAN 46, described below) and provided by, for example, media streaming (e.g., a video-on-demand (VOD)) service or another placeshifting device.

Client media receiver 14 may be any portable electronic device suitable for performing the processes and functions described herein. A non-exhaustive list of suitable electronic devices includes smartphones, wearable devices, tablet devices, laptop computers, and desktop computers. Client media receiver 14 outputs visual signals for presentation on display device 48 when engaged in a local PVR streaming session or when otherwise presenting imagery on the screen of display device 48. Display device 48 can be integrated into client media receiver 14 as a unitary system or electronic device. This may be the case when, for example, client media receiver 14 assumes the form of a mobile phone, tablet, laptop computer, or similar electronic device having a dedicated display screen. Alternatively, display device 48 can assume the form of an independent device, such as a freestanding monitor or television set, which is connected to client media receiver 14 via a wired or wireless connection.

By way of non-limiting illustration, client media receiver 14 is shown in FIG. 1 as containing at least one processor 50, an associated memory 52, and a number of I/O features 54. I/O features 54 can include various different types of interfaces, such as a network interface (e.g., WIFI interface 56, described below), an interface to mass storage, an interface to display device 48, and any number of user input interfaces; e.g., physical keyboards, buttons, switches, touch-screen interfaces, microphones for receiving user voice input, cameras, or the like. Client media receiver 14 may execute a software program or application 58 directing the various hardware features of client media receiver 14 to perform the functions described herein. Application 58 suitably interfaces with processor 50, memory 52, and I/O features 54 via any conventional OS 60 to provide such functionalities.

Application 58 includes control logic 62 adapted to process user input, obtain streaming content from one or more content sources (including PVR 12), decode received content streams, and provide corresponding output signals to display device 48. In this regard, control logic 62 may establish a data sharing connection with PVR 12 enabling wireless bidirectional communication with controller 18 such that a local PVR streaming session can be established and maintained when so desired. During a local PVR streaming session, PVR 12 streams selected media content to client media receiver 14 over personal LAN 24. The streaming content is received by client media receiver 14 and decoded by one of decoding modules 64, 66, which may be implemented utilizing any combination of hardware and/or software executing on processor 50. The decoded programming is then utilized to generate output signals supplied to display device 48 for presentation to an end user operating client media receiver 14. In some embodiments, the content streamed from PVR 12 to receiver 14 may be concurrently presented with other content retrieved over WAN 46; e.g., as schematically indicated in FIG. 1, one or more secondary images 68 (also referred to as "supplemental imagery") may be superimposed over a main or primary image 70 (the PVR-streamed imagery) generated on a screen of display device 48. Further discussion in this regard is provided below.

In operation, control logic 62 of client media receiver 14 obtains programming in response to end user input or commands received via a user interface, such as a touch-screen or keyboard interface, included within I/O features 54. Control logic 62 may establish a control connection with WIFI-enabled PVR 12 via personal LAN 24 enabling the transmission of commands from control logic 62 to controller 18. Accordingly, PVR 12 may operate by responding to commands received from a client media receiver 14 via LAN 24. Such commands may include information utilized to initiate a local PVR streaming session, such as data supporting mutual authentication of PVR 12 and client media receiver 14. Communications transmitted from PVR 12, over personal LAN 24, and to PVR 12 may be encoded by one of encoders 72, 74 further realized in hardware, software executing on client media receiver 14, or a combination thereof. The respective outputs of encoders 72, 74 may be applied to WIFI interface 56 of client media receiver 14, which may possess a single physical antenna in at least some embodiments. Concurrently, and as indicated in FIG. 1 by arrow 78, client media receiver 14 may maintain a connection with a broader WAN 46, such as the Internet, utilizing antenna 76 and WIFI interface 56. This allows an end user to utilize client media receiver 14 to browse the Internet, view or otherwise interact with social media platforms, and perform other such WAN-related tasks, while streaming (or temporarily pausing streaming) of media content from WIFI-enabled PVR 12 and without requiring switching between WIFI networks or zones. Additionally, in certain instances, this permits data exchange 80 with a backend service 82, which may maintain a server or server farm 84 and database 86 for performing certain complementary functions in conjunction with local PVR streaming, as discussed more fully below in conjunction with FIG. 2.

With continued to the exemplary embodiment shown in FIG. 1, client media receiver 14 creates a layered DVA scheme or structure during execution of application 58 on receiver OS 60. The DVA structure defines two virtual or logical antennae, as identified in by dashed boxes 88, 90 in FIG. 1. Virtual antennae 88, 90 are referred to as "virtual" or "logical" antennae to indicate that antennae 88, 90 are created in a conceptual or software sense, possibly while utilizing the same physical antenna (e.g., antenna 76) for bidirectional communication purposes. Virtual antenna 88 includes decoder 64 and encoder 72, while virtual antenna 90 includes decoder 66 and encoder 72. As indicated above, decoders 64, 66 and encoders 72, 74 may be implemented as software modules utilizing common hardware, although the possibility that receiver 14 may include physically separate encoders and/or decoders in embodiments is not precluded. Controller 62 further includes a logical switch 92, which allows different data output transmission to be routed to different encoders 72, 74 in accordance with a preestablished schedule or DVA parameters (discussed below). In this manner, client media receiver 14 can effectively maintain active access points with two WIFI zones or channels simultaneously: here, personal LAN 24 and WAN 46. This provides a number of benefits, as discussed below.

Figure 2:
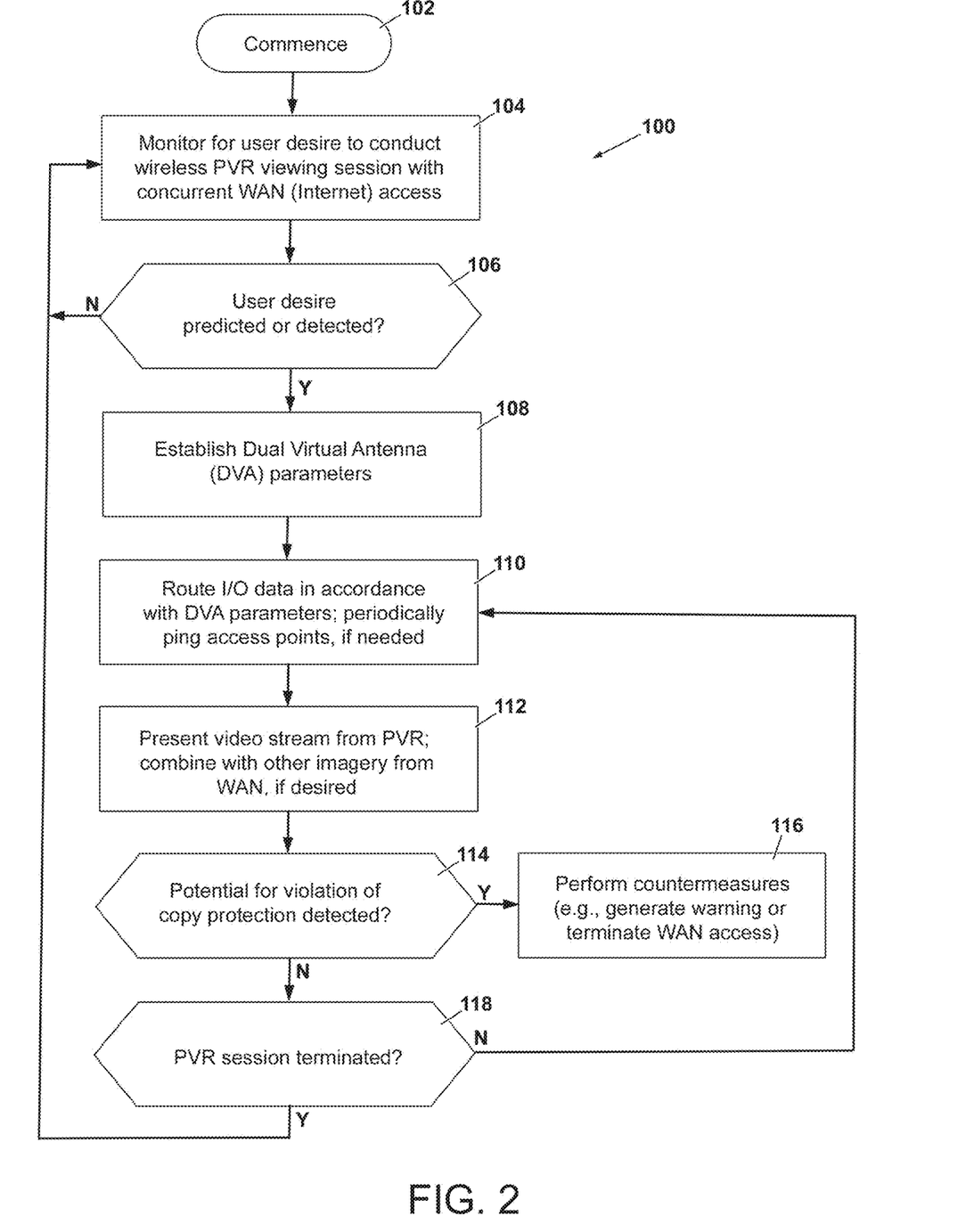
FIG. 2 is a flowchart of a method carried-out by one or more of the devices (e.g., the client media receiver) depicted in FIG. 1 enabling streaming of media content from the PVR, to the client media receiver, and over a personal LAN, while further allowing concurrent WAN access and other functionalities, as illustrated in accordance with exemplary embodiment of the present disclosure.

Advancing to FIG. 2, an exemplary method 100 is shown for enabling WAN access in conjunction with streaming of media content from WIFI-enabled PVR 12 over personal LAN 24. Method 100 may be largely or entirely carried-out by media client receiver 14 (specifically, by software application 58 executing on receiver OS 60) in embodiments and will be principally described below as such; however, as will become apparent from the following description, certain aspects of method 100 may be performed by other systems, devices, or components included in system 10 (e.g., PVR 12 and/or backend service 82) in some implementations. As indicated in FIG. 2, method 100 includes a number of steps or process functions identified as STEPS 102, 104, 106, 108, 110, 112, 114, 116, 118. Each of these process steps are described, in turn, below. The steps shown in FIG. 2 and described below are offered by way of non-limiting example only. In alternative embodiments of method 100, additional process steps may be performed, certain steps may be omitted, and/or the illustrated steps may be performed in varying sequences.

After commencing (STEP 102), method 100 advances to STEP 104. During STEP 104, client media receiver 14 (FIG. 1) monitors for a user desire to conduct a wireless PVR streaming session in conjunction with concurrent WAN access. In many cases, such a desire will manifest when client media receiver 14 is currently connected to WAN 46 (e.g., as a default WIFI network established in a user's residence, vehicle, or the like), with the user subsequently taking steps to initiate a streaming video session with PVR 12 over personal LAN 24. It is also possible, however, that client media receiver 14 may initially connect to WIFI-enabled PVR 12 over personal LAN 24, and an end user subsequently utilizes receiver 14 (e.g., while pausing viewing of a particular media content item or allowing the content item to continue to play in the background) to access the Internet or another WAN utilizing receiver 14.

Next, at STEP 106 of method 100, client media receiver 14 (FIG. 1) identifies a user desire to conduct a wireless PVR viewing session utilizing the client media receiver, while maintaining wireless WAN access. Stated differently, during STEP 106, receiver 14 determines whether a user desire to conduct a wireless PVR streaming session in conjunction with concurrent WAN access has been predicted, detected, or otherwise established. In embodiments, client media receiver 14 may predict such a user desire when the user opens or launches a particular software application, such as application 58, installed on receiver 14 and utilized to connect to and control PVR. Additionally or alternatively, client media receiver 14 may determine that such a user desire exists if the end user should provide input commanding receiver 14 to initiate a wireless PVR streaming session (or taking steps in furtherance of initiating a PVR streaming session) in conjunction with concurrent WAN access. As a still further possibility, such a user desire may be inferred if, during a wireless PVR viewing session, the user launches a web browser application, while pausing the streamed video content or allowing continued playback of the video content in the background. If determining that such a user desire exists, client media receiver 14 progresses to STEP 108 of method 100, as described below. Otherwise, receiver 14 returns to STEP 104 and the foregoing process steps repeat.

At STEP 108, client media receiver 14 (FIG. 1) establishes layered DVA parameters for usage during the ensuing wireless PVR streaming session. Generally, the DVA parameters include the creation of virtual antennae 88, 90 and assignment of antennae 88, 90 to corresponding access points. In this regard, and referring jointly to FIGS. 1-2, client media receiver 14 may assign virtual antennae 88 to a first WIFI connection (e.g., one of WAN 46 and personal LAN 24) and virtual antennae 90 to a second WIFI connection (e.g., the other of WAN 46 and personal LAN 24). Subsequently, when receiving wireless transmissions via antenna 76, controller 62 determines that appropriate virtual antenna over which to route the wireless transmission. This can be determined based upon incoming frequency band or channel of the incoming data; utilizing a temporal scheduling process; utilizing data contained in the incoming signals (e.g., code-division multiple access data) indicative of the source of the data; or in any other suitable manner. In one embodiment, WIFI-enabled PVR 12 may embed a unique identifier in incoming signals (e.g., in the header portion of the signal transmission) indicating that such data is provided by PVR 12. Thus, in such instances, controller 62 may determine that incoming signals bearing such PVR-identifying data originate from PVR 12, while incoming signals lacking such data originate from another source communicating over WAN 46.

Similarly, when transmitting outgoing data signals, controller 62 determines the appropriate one of virtual antennae 88, 90 through which the data signals should be routed and then controls logical switch 92 accordingly. For example, in a scenario in which virtual antenna 88 is assigned to WAN 46, while virtual antenna 90 is assigned to personal LAN 24, outgoing data signals intended for transmission over WAN 46 may be directed through encoder 72 and modulated accordingly, while outgoing data signals intended for transmission to PVR 12 may be directed through encoder 74 and modulate for transmission over personal LAN 24. Such a routing or scheduling process is identified in FIG. 2 at STEP 110. As further noted at STEP 110, client media receiver 14 may also periodically ping either or both network access points, if and when needed, to maintain both access points in active status. This may be particularly beneficial when a user is engaged in viewing media content streamed from PVR 12 and allows the network connection to WAN 46 to remain inactive for a prolonged period of time. In such instances, receiver while may repeatedly transmit ping signals from to the WAN access point to prevent WAN timeout, while supporting the wireless PVR viewing session.

Next, as indicated in FIG. 2 at STEP 112, client media receiver 14 presents the video stream received from PVR 12 on display device 48 for viewing by the end user. Referring briefly once again to FIG. 1, client media receiver 14 may generate the streamed video content on display device 48 as primary image 70 (hereafter, "PVR-streamed imagery 70") during STEP 112 of method 100. PVR-streamed imagery 70 may occupy the entire screen area of device 48 or only a portion thereof; e.g., as may be case when, for example, PVR-streamed imagery 70 is sized to fit a graphical window included in a Graphical User Interface (GUI) of OS 60 or an application executing on OS 60. In certain embodiments, client media receiver 14 may concurrently display other imagery 68 (secondary or supplemental content) in conjunction with PVR-streamed imagery 70. Such secondary imagery 68 may be retrieved by client media receiver 14 utilizing the active connection to WAN 46 and, therefore, the particular virtual antenna 88, 90 assigned to the WAN WIFI connection. Secondary imagery 68 may be concurrently displayed with PVR-streamed imagery 70 in various manners, whether secondary imagery 68 is visually integrated into or blended with PVR-streamed imagery 70, superimposed over imagery 70 (e.g., as a Picture-in-Picture window or scroll bar), or displayed alongside imagery 70 in a separate region of the display screen.

When displayed in conjunction with PVR-streamed imagery 70, secondary imagery 68 may or may not pertain to the content depicted by imagery 70 in some manner. For example, in certain implementations, a user may choose (e.g., via selection of an option presented by a GUI in application 58) to concurrently view a scroll feed or data (e.g., text) crawl. Such a crawl can be superimposed over an upper or lower strip region of primary imagery 70; or, instead, displayed in a separate region or window snapped to the bottom, top, or side of a larger window in which imagery 70 is presented. When generated, such a scroll may display a live feed of information selected by the user of receiver 14.

This may include a user's email inbox, a user's social media feed (e.g., TWITTER® or FACEBOOK® feed), current sports scores, news headlines, stock exchange information, or the like, any or all of which may be retrieved from suitable sources (e.g., backend service 82) in communication with receiver 14 over WAN 46. In still other embodiments, such information retrieved over WAN 46 can be displayed as secondary imagery 68 concurrently with primary PVR-streamed imagery 70 in another manner, whether on a continual or repeated temporary basis; e.g., in a further implementation, notification noting newly-received communications (e.g., email communications, social media posts, or the like) can be presented when received as, for example, pop-up or push notifications superimposed over primary imagery 70 on a temporary basis.

In other embodiments, secondary imagery 68 may be retrieved from backend service 82 in response to an initial retrieve or GET message transmitted by receiver 14 indicating that a PVR viewing session has commenced. In this case, secondary imagery 68 can be advertising content, which may or may not relate to the particular type of content (e.g., genre of movie or TV programming, a particular actor or actress appearing in primary imagery 70, or the like) supplied to receiver 14 by WIFI-enabled PVR 12. As a still further possibility, client media receiver 14 may transmit a message to backend service 82 relating identifying information pertaining to the media content (e.g., the type of programming) a user is presently viewing as PVR-streamed content. Backend service 82 may then supply, in return, advertisements or supplemental content (e.g., Universal Resource Links relating to the content, actor biographies, and/or other such information) relating to the PVR-streamed content, which client media receiver 14 may then presents on display device 48 in conjunction with PVR-streamed imagery 70. In still other embodiments, client media receiver 14 may periodically or selectively transmit reports to backend service 82 regarding the particular type of media content viewed by the end user or other information pertaining to user viewing habits, which service 82 may utilize to construct or refine a user viewing profile. Stated differently, receiver 14 may transmit such a report to identify the streaming media content presented during the wireless PVR viewing session.

In certain embodiments, client media receiver 14 may also determine whether indicia or a heightened potential for the violation of copy protection measures exists (STEP 114) during the PVR streaming session; e.g., due to actions performed by the end user or another party attempting to access personal LAN 24 via WAN 46. If determining that indicia or a heightened potential for the violation of copy protection measure exists, receiver 14 may perform certain precautionary actions or countermeasures. Such countermeasures may help ease any concerns that may arise in providing media content, which may be protected by DRM, PRM, or other rights, in a streaming environment in which access to the Internet or another WAN is provided. For example, actions taken by a user in an effort to disseminate the streamed PVR content over WAN 46 in some manner may constitute such an attempted copy protection violation event. So too may an attempt by an end user to create an unauthorized copy of copy-protected media content. Thus, if the query posed at STEP 114 of method 100 is answered in the positive, client media receiver 14 may advance to STEP 116 and perform certain countermeasures, as discussed below.

The countermeasure taken at STEP 116 of method 100 will vary among embodiments; and, in less severe cases or upon detection of a first attempt to violate copy protection measures, may include the generation of a warning, such as a visual warning presented on display device 48. In more severe cases or upon detection of repeated attempts, client media receiver 14 may terminate one or both of the connections to LAN 24 and WAN 46 in response to the perceived attempt to violate copy protection measures. For example, in certain implementations, receiver 14 may terminate the WIFI connection to WAN 46, in which case re-establishment of the connection to WAN 46 may be prevented until the current PVR streaming session ceases and, perhaps, for all future PVR streaming sessions. If desired, messages reporting such behavior or discrepancies (that is, detected attempts at copy protection measure violation) may be transmitted from receiver 14, over WAN 46, and to backend service 82. Such messages may be transmitted in response to any instance of detection of potential copy protection measure violation, only in severe cases, or only after a certain number of attempts at copy protection violation have been detected.

Finally, at STEP 118 of method 100, client media receiver 14 determines whether the current PVR session should continue or should instead be terminated. If determining that the current PVR session should be terminated (e.g., due to user input), receiver 14 returns to STEP 104 thereby effectively terminating the present iteration of method 100. Alternatively, if determining that the current PVR session should continue, client media receiver 14 returns to STEP 110 and the foregoing process steps repeat or loop until cessation of the present iteration of method 100. In this manner, a user may view PVR-streamed media content without disruption to WIFI access to a broader WAN (e.g., the Internet) and without engaging in the often cumbersome process of repeatedly switching WIFI zones or networks, as previously described.

CONCLUSION

There has thus been provided embodiments of devices, methods, and program products enabling personal network streaming (that is, streaming of media content over a secure personal LAN) concurrent with WAN access. Embodiments of the present disclosure can be implemented on pre-existing client media receivers largely, if not wholly through software. In this regard, a software application may create a unique DVA structure or scheme enabling simultaneous access to multiple WIFI zones or networks, one of which may support WAN (Internet) access and the other of which supports streaming delivery of content transmitted by a WIFI-enabled PVR over a personal LAN. In certain embodiments, the client media receiver may further enable the concurrent display of content or imagery retrieved utilizing the WAN connection (e.g., provided by a backend server or service) and potentially relating to the PVR-streamed content into the primary image of the streamed content. Additionally or alternatively, the client media receiver may perform certain processes to decrease the likelihood of copy protection circumvention of the streamed media content. In this manner, user convenience can be enhanced when streaming media content from a WIFI-enabled PVR, while preserving the security or integrity of any copy protection pertaining to the streamed content.

While principally described above in connection with exemplary devices (e.g., a client media receiver) and methods, the teachings of the present disclosure also pertain to program products. Accordingly, embodiments of a program product, which is utilized in conjunction with a client media receiver containing a processor, have been disclosed. In various embodiments, the program product includes a non-transitory computer-readable medium and computer-readable instructions stored on the non-transitory computer-readable medium. When executed by the processor, the computer-readable instructions causes the client media receiver to identify a user desire to conduct a wireless PVR viewing session, while maintaining wireless access to a WAN. When identifying a user to conduct a wireless PVR viewing session, while maintaining wireless access to the WAN, utilize a software application executing on the client media receiver to: (i) create a personal LAN enabling wireless communication between the client media receiver and a PVR; and (ii) establish DVA parameters defining a first virtual antenna assigned to the WAN and a second virtual antenna assigned to the personal LAN. In accordance with the computer-readable instructions, the second virtual antenna is utilized to support a wireless PVR viewing session during which the client media receiver receives streaming media content from the PVR over the personal LAN for presentation on a display device, while concurrently routing WAN data through the first virtual antenna.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method carried-out by a client media receiver utilized in conjunction with a Personal Video Recorder (PVR) and a display device, the method comprising:
   identifying a user desire to conduct a wireless PVR viewing session utilizing the client media receiver, while maintaining wireless access to a Wide Area Network (WAN);
   when identifying a user to conduct a wireless PVR viewing session, while maintaining wireless access to the WAN, utilizing a software application executing on the client media receiver to:
      create a personal Local Area Network (LAN) enabling wireless communication between the client media receiver and the PVR; and
      establish Dual Virtual Antenna (DVA) parameters defining a first virtual antenna assigned to the WAN and a second virtual antenna assigned to the personal LAN; and
   utilizing the second virtual antenna to support a wireless PVR viewing session during which the client media receiver receives streaming media content from the PVR over the personal LAN for presentation on the display device, while concurrently routing WAN data through the first virtual antenna.

2. The method of claim 1 wherein identifying comprises predicting that a user desires to conduct a wireless PVR viewing session utilizing the client media receiver, while maintaining wireless access to the WAN, in response to launch of a software application on the client media receiver utilized to control the PVR.

3. The method of claim 1 wherein identifying comprises determining that a user desires to conduct a wireless PVR viewing session utilizing the client media receiver, while maintaining wireless access to the WAN, when receiving user input commanding the client media receiver to initiate a wireless PVR streaming session.

4. The method of claim 1 further comprising, while supporting the wireless PVR viewing session, repeatedly transmitting ping signals from the wireless media receiver to the WAN to prevent WAN timeout.

5. The method of claim 1 further comprising:
   monitoring, at the client media receiver, for indicia of copy protection violation during the wireless PVR viewing session; and
   if finding indicia of copy protection violation, performing at least one predetermined copy protection violation countermeasure.

6. The method of claim 5 wherein performing at least one predetermined copy protection violation countermeasure comprises outputting a warning from the client media receiver for display on the display device.

7. The method of claim 6 wherein performing at least one predetermined copy protection violation countermeasure comprises, at the client media receiver, terminating WAN access during the wireless PVR viewing session.

8. The method of claim 1 further comprising, at the client media receiver, routing incoming data between the first virtual antenna and the second antenna during the wireless PVR viewing session based, at least in part, on a frequency band of the incoming data.

9. The method of claim 1 further comprising, at the client media receiver, routing incoming data between the first virtual antenna and the second antenna during the wireless PVR viewing session based, at least in part, on information contained in the data indicative of a source of the data.

10. The method of claim 9 wherein routing comprises determining the source of data based, at least in part, on whether an incoming data signal contains information uniquely identifying the PVR.

11. The method of claim 1 further comprising combining, at the client media receiver, primary imagery from the PVR viewing session with supplemental imagery obtained via the WAN for concurrent display on the display device.

12. The method of claim 11 further comprising obtaining the supplemental imagery from a backend service in communication with the client media receiver over the WAN.

13. The method of claim 12 wherein obtaining comprises:
   transmitting, from the client media receiver, information to the backend service identifying the streaming media content presented during the wireless PVR viewing session; and
   in response to transmitting the information, receiving at the client media receiver the supplement imagery provided by backend service.

14. The method of claim 11 wherein the supplemental imagery comprises at least one universal resource link pertaining to the streaming media content presented during the wireless PVR viewing session.

15. The method of claim 11 wherein the supplemental content comprises a scroll displaying a live feed of information selected by a user operating the client media device.

16. The method of claim 1 further comprising transmitting a report, from the client media receiver, over the WAN, and to a backend service, identifying the streaming media content presented during the wireless PVR viewing session.

17. The method of claim 1 further comprising storing media content in a memory of the PVR, as placeshifted from a home media receiver, for subsequent streaming transmission to the client media receiver.

18. A client media receiver utilized in conjunction with a display device and a Personal Video Recorder (PVR), the client media receiver comprising:
 a storage medium containing computer-readable instructions; and
 a processor coupled to the storage medium and, when executing the computer-readable instructions, causing the client media receiver to:
  identify a user desire to conduct a wireless PVR viewing session, while maintaining wireless access to a Wide Area Network (WAN);
  when identifying a user to conduct a wireless PVR viewing session, while maintaining wireless access to the WAN, utilize a software application executing on the client media receiver to:
   create a personal Local Area Network (LAN) enabling wireless communication between the client media receiver and the PVR; and
   establish Dual Virtual Antenna (DVA) parameters defining a first virtual antenna assigned to the WAN and a second virtual antenna assigned to the personal LAN; and
  utilize the second virtual antenna to support a wireless PVR viewing session during which the client media receiver receives streaming media content from the PVR over the personal LAN for presentation on the display device, while concurrently routing WAN data through the first virtual antenna.

19. The client media receiver of claim 18 wherein the computer-readable instructions, when executed by the processor, further cause the client media receiver to:
 predict that a user desires to conduct a wireless PVR viewing session utilizing the client media receiver, while maintaining wireless access to the WAN, in response to launch of a software application on the client media receiver utilized to control the PVR.

20. A program product utilized in conjunction with a client media receiver containing a processor, the program product comprising:
 a non-transitory computer-readable medium; and
 computer-readable instructions stored on the non-transitory computer-readable medium, when executed by the processor the computer-readable instructions causing the client media receiver to:
  identify a user desire to conduct a wireless Personal Video Recorder (PVR) viewing session, while maintaining wireless access to a Wide Area Network (WAN);
  when identifying a user to conduct a wireless PVR viewing session, while maintaining wireless access to the WAN, utilize a software application executing on the client media receiver to:
   create a personal Local Area Network (LAN) enabling wireless communication between the client media receiver and a PVR; and
   establish Dual Virtual Antenna (DVA) parameters defining a first virtual antenna assigned to the WAN and a second virtual antenna assigned to the personal LAN; and
  utilize the second virtual antenna to support a wireless PVR viewing session during which the client media receiver receives streaming media content from the PVR over the personal LAN for presentation on a display device, while concurrently routing WAN data through the first virtual antenna.

* * * * *